United States Patent
Tsukada et al.

(10) Patent No.: US 11,218,013 B2
(45) Date of Patent: Jan. 4, 2022

(54) POWER SUPPLY SYSTEM

(71) Applicant: TOYOTA JIDOSHA KABUSHIKI KAISHA, Toyota (JP)

(72) Inventors: Hiroshi Tsukada, Nagakute (JP); Shuji Tomura, Nagakute (JP); Kazuo Ootsuka, Nagakute (JP); Naoki Yanagizawa, Nagakute (JP); Kyosuke Tanemura, Nagakute (JP); Junta Izumi, Nagoya (JP); Kenji Kimura, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/012,581

(22) Filed: Sep. 4, 2020

(65) Prior Publication Data
US 2021/0203178 A1 Jul. 1, 2021

(30) Foreign Application Priority Data

Dec. 25, 2019 (JP) .............................. JP2019-234070

(51) Int. Cl.
*H02J 7/00* (2006.01)
*H02J 1/02* (2006.01)

(52) U.S. Cl.
CPC .............. *H02J 7/0071* (2020.01); *H02J 1/02* (2013.01); *H02J 7/0013* (2013.01)

(58) Field of Classification Search
CPC ........... H02J 7/0071; H02J 1/02; H02J 7/0013
See application file for complete search history.

(56) References Cited

U.S. PATENT DOCUMENTS 10,044,069 B2 * 8/2018 Despesse ............ H01M 10/486
2020/0076206 A1 3/2020 Goto et al.

FOREIGN PATENT DOCUMENTS

| JP | 2018-074709 A | 5/2018 |
| JP | 2018-174029 A | 11/2018 |
| JP | 2018-174607 A | 11/2018 |
| JP | 2018-174626 A | 11/2018 |
| JP | 2018-182782 A | 11/2018 |
| JP | 2018-182783 A | 11/2018 |
| WO | 2018/079664 A1 | 5/2018 |

* cited by examiner

*Primary Examiner* — Carlos Amaya
(74) *Attorney, Agent, or Firm* — Sughrue Mion, PLLC

(57) ABSTRACT

A power supply system includes a plurality of battery modules and a control unit, and supplies electric power from the battery modules in an uppermost stage and a lowermost stage to a load. The control unit is configured to perform ON/OFF control for setting the battery modules to an ON state in an active time, setting the battery modules to an OFF state in a non-active time, and alternately repeating the active time and the non-active time. The control unit is configured to delay an ON/OFF control timing for the battery module in a lower stage adjacent to the battery module in a higher stage by a control delay time in comparison with the battery module in the higher stage. The control unit is configured to randomly determine the control delay times for the battery modules in lower stages than the battery module in the uppermost stage.

15 Claims, 12 Drawing Sheets

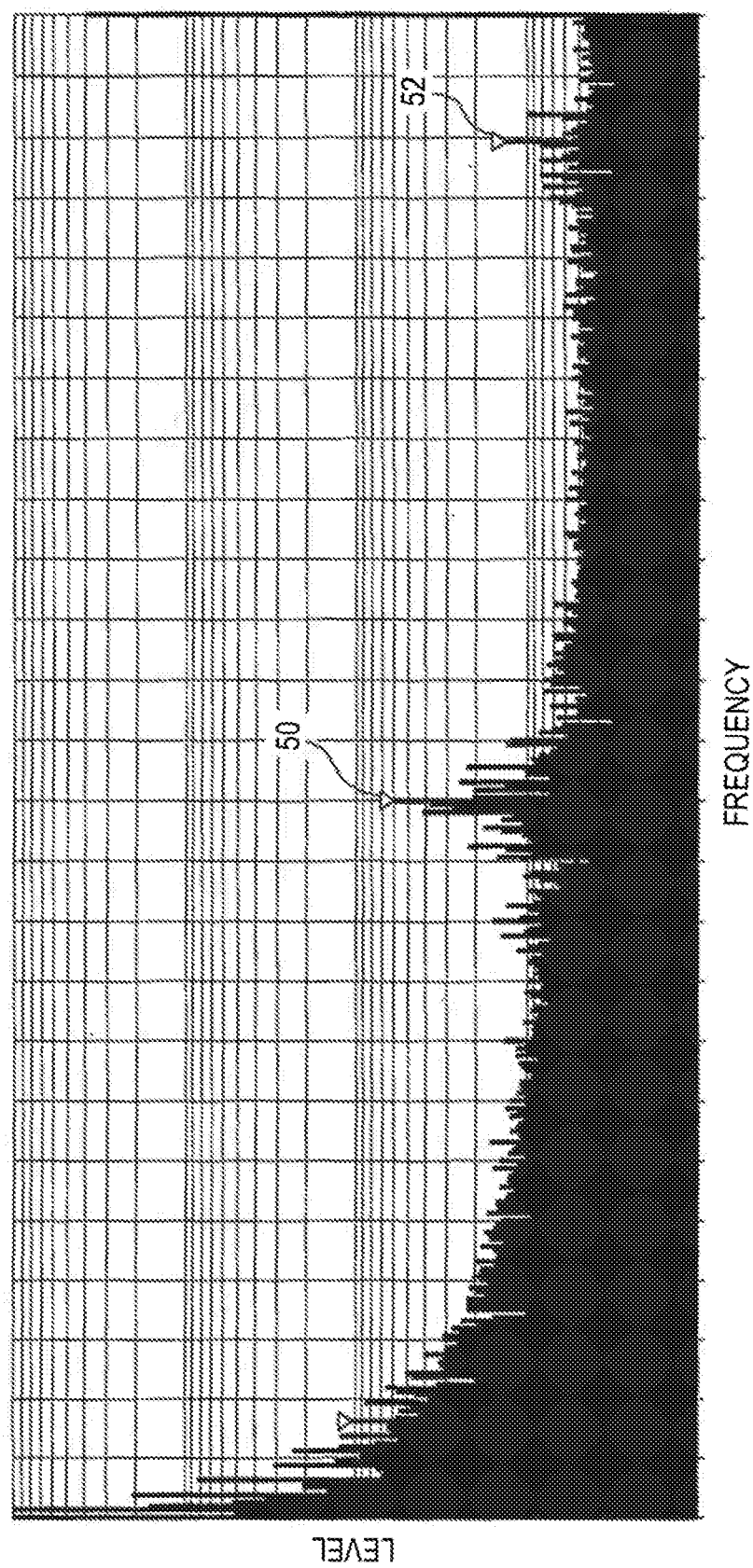

POWER SUPPLY SYSTEM

CROSS-REFERENCE TO RELATED APPLICATION

This application claims priority to Japanese Patent Application No. 2019-234070 filed on Dec. 25, 2019, incorporated herein by reference in its entirety.

BACKGROUND

1. Technical Field

The disclosure relates to a power supply system and more particularly to a system including a plurality of battery modules which is connected in series.

2. Description of Related Art

A power supply system in which a plurality of battery modules is connected in series has been researched and developed. A battery module includes a battery and a switch circuit and a state thereof is switched to any one of an ON state in which a voltage of the battery is output from a pair of terminals and an OFF state in which the pair of terminals is short-circuited by switching of the switch circuit.

In a power supply system in which a plurality of battery modules is connected in series, a load is connected between a battery module in an uppermost stage and a battery module in a lowermost stage. By switching each battery module between the ON state and the OFF state, a voltage based on the battery modules in the ON state is applied to the load. Japanese Unexamined Patent Application Publication No. 2018-74709 (JP 2018-74709 A), Japanese Unexamined Patent Application Publication No. 2018-174029 (JP 2018-174029 A), Japanese Unexamined Patent Application Publication No. 2018-174607 (JP 2018-174607 A), Japanese Unexamined Patent Application Publication No. 2018-174626 (JP 2018-174626 A), Japanese Unexamined Patent Application Publication No. 2018-182782 (JP 2018-182782 A), and Japanese Unexamined Patent Application Publication No. 2018-182783 (JP 2018-182783 A) disclose a power supply system in which a plurality of battery modules is connected in series. In the power supply systems disclosed in these patent publications, sweep switching for setting a battery module to an ON state for a predetermined active time is performed sequentially from a higher stage to a lower stage. In sweep switching, ON/OFF control of a switch circuit is performed on a downstream battery module adjacent to an upstream battery module at a timing which is delayed by a predetermined delay time. By this sweep switching, a combined output voltage of batteries in a desired number of battery modules is applied to a load and electric power is supplied from the batteries in the desired number of battery modules to the load.

SUMMARY

In a power supply system in which a plurality of battery modules is connected in series and which performs sweep switching, a noise voltage or a noise current is generated through ON/OFF control of the battery modules. The power supply system may not be appropriately controlled due to such noise.

The disclosure provides a power supply system in which a plurality of battery modules is connected in series and which can decrease an influence of noise generated in the power supply system on its own operation.

According to an aspect of the disclosure, there is provided a power supply system including a plurality of battery modules that is connected in series and a control unit configured to control the battery modules, wherein electric power is supplied from the battery modules in an uppermost stage and a lowermost stage to a load, and wherein the control unit is configured to perform ON/OFF control for setting the battery modules to an ON state in an active time, setting the battery modules to an OFF state in a non-active time, and alternately repeating the active time and the non-active time, to perform the ON/OFF control of the plurality of battery modules such that an ON/OFF control timing for the battery module in a lower stage adjacent to a battery module in a higher stage is delayed by a control delay time in comparison with the battery module in the higher stage, and to randomly determine the control delay times for the battery modules in lower stages than the battery module in the uppermost stage.

According to another aspect of the disclosure, there is provided a power supply system including a plurality of battery modules that is connected in series and a control unit configured to control the battery modules, wherein electric power is supplied from the battery modules in an uppermost stage and a lowermost stage to a load, and wherein the control unit is configured to perform ON/OFF control for setting the battery modules to an ON state in an active time, setting the battery modules to an OFF state in a non-active time, and alternately repeating the active time and the non-active time, to perform the ON/OFF control of the plurality of battery modules such that an ON/OFF control timing for the battery module in a lower stage adjacent to a battery module in a higher stage is delayed by a control delay time in comparison with the battery module in the higher stage, and to randomly determine the active time for each battery module.

Preferably, the control unit may be configured to randomly determine a period which is a sum of the active time and the non-active time for each battery module.

According to still another aspect of the disclosure, there is provided a power supply system including a plurality of battery modules that is connected in series and a control unit configured to control the battery modules, wherein electric power is supplied from the battery modules in an uppermost stage and a lowermost stage to a load, and wherein the control unit is configured to perform ON/OFF control for setting the battery modules to an ON state in an active time, setting the battery modules to an OFF state in a non-active time, and alternately repeating the active time and the non-active time, to perform the ON/OFF control of the plurality of battery modules such that an ON/OFF control timing for the battery module in a lower stage adjacent to the battery module in a higher stage is delayed by a control delay time in comparison with the battery module in the higher stage, and to randomly determine a period which is a sum of the active time and the non-active time for each battery module.

Preferably, the control unit may be configured to randomly determine the control delay time for the battery modules in lower stages than the battery module in the uppermost stage.

Preferably, the control unit may be configured to randomly determine the control delay time for each battery module when an electric power supply state with respect to the load is controlled by changing at least one of a period which is a sum of the active time and the non-active time, the active time, and the control delay time.

Preferably, the control unit may be configured to randomly determine the active time for each battery module when an electric power supply state with respect to the load is controlled by changing at least one of a period which is a sum of the active time and the non-active time, the active time, and the control delay time.

Preferably, the control unit may be configured to randomly determine the period which is a sum of the active time and the non-active time for each battery module when an electric power supply state with respect to the load is controlled by changing at least one of the period, the active time, and the control delay time.

Preferably, the control unit may be configured to perform the ON/OFF control on the battery module in the uppermost stage according to an ON/OFF control timing for the battery module in any one stage lower than the uppermost stage.

According to the aspects of the disclosure, it is possible to decrease an influence of noise generated in the power supply system on its own operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 12 is a diagram illustrating a simulation result when the power supply system operates in the delay time and period change mode.

Figure 1:
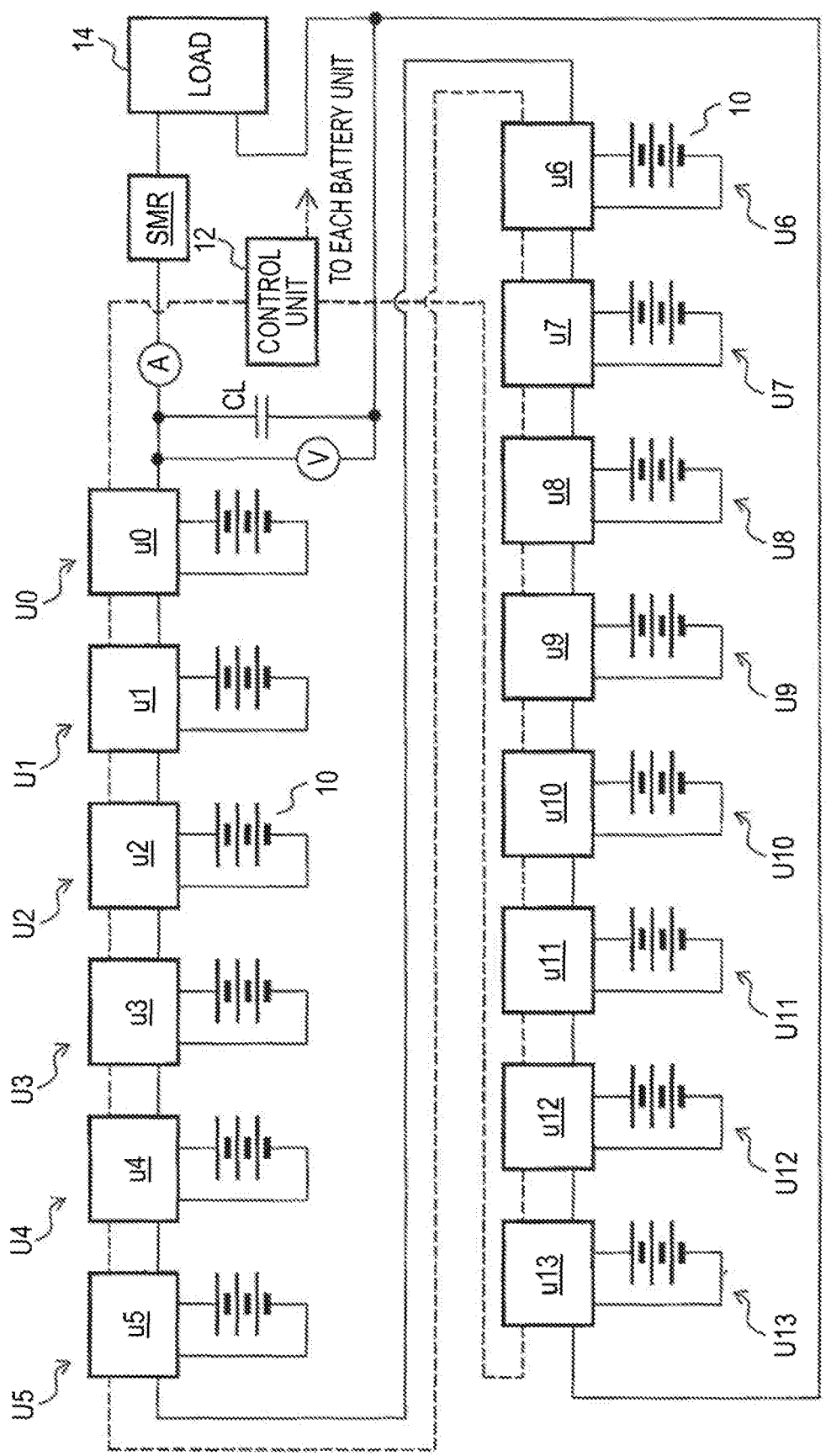
FIG. 1 is a diagram illustrating a configuration of a power supply system.

DETAILED DESCRIPTION OF EMBODIMENTS (1) Configuration of Power Supply System

A power supply system according to an embodiment of the disclosure will be described below with reference to the accompanying drawings. The same elements in the drawings will be referred to by the same reference signs and description thereof will be omitted.

FIG. 1 illustrates a configuration of a power supply system according to an embodiment of the disclosure. The power supply system includes battery modules U0 to U13, a control unit 12, a load capacitor CL, a system main relay switch SMR (hereinafter simply referred to as an SMR), a voltmeter V, and an ammeter A. The battery modules U0 to U13 include main circuits u0 to u13, respectively. Each battery module Ui includes a battery 10 to which both ends of the main circuit ui are connected. Here, i is an integer of 0 to 13. In FIG. 1, a power line for transmitting electric power is represented by a solid line, and a control line for transmitting a control signal is represented by a dotted line. The battery modules U0 to U13 are connected in series by power lines and control lines based on a circuit configuration which will be described later. The power supply system according to this embodiment employs 14 battery modules U0 to U13, but the number of battery modules which are employed may be an arbitrary number equal to or greater than 2.

The battery module U0 in an uppermost stage is connected to one end of the ammeter A. The other end of the ammeter A is connected to one end of the SMR, and the other end of the SMR is connected to one end of a load 14. The battery module U13 in a lowermost stage is connected to the other end of the load 14. The load capacitor CL and the voltmeter V are connected in parallel between the power line between the battery module U0 in the uppermost stage and the load 14 and the power line between the battery module U13 in the lowermost stage and the load 14.

A measured voltage value from the voltmeter V and a measured current value from the ammeter A are output to the control unit 12. The control unit 12 controls the battery modules Ui based on at least one of the measured voltage value and the measured current value. The control unit 12 turns on the SMR when electric power is supplied to the load 14, and turns off the SMR when supply of electric power to the load 14 is cut off. In the following description, a state of the power supply system when the SMR is turned on will be described.

(2) Configuration of Battery Module

Figure 2:
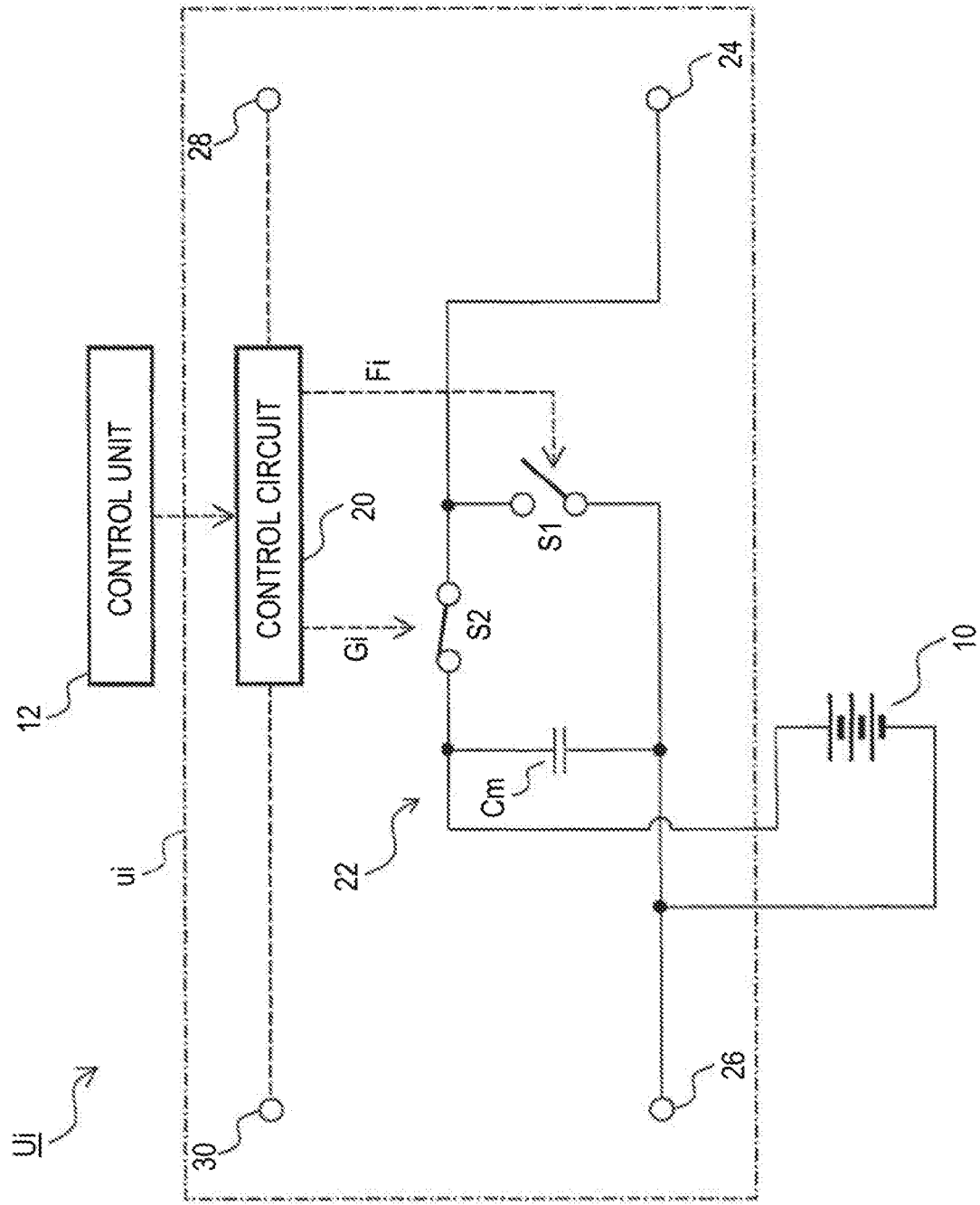
FIG. 2 is a diagram illustrating a detailed configuration of a battery module.

FIG. 2 illustrates a detailed configuration of each battery module Ui. The battery module Ui includes the main circuit ui and the battery 10. The main circuit ui includes a control circuit 20, a switch circuit 22, an upstream power terminal 24, a downstream power terminal 26, an upstream control terminal 28, and a downstream control terminal 30. The switch circuit 22 includes a first switching element S1, a second switching element S2, and an intra-module capacitor Cm. One end of the first switching element S1 is connected to the upstream power terminal 24. The other end of the first switching element S1 is connected to the downstream power terminal 26. One end of the second switching element S2 is connected to the upstream power terminal 24 and the other end of the second switching element S2 is connected to a positive electrode terminal of the battery 10. A negative electrode terminal of the battery 10 is connected to the downstream power terminal 26. The intra-module capacitor Cm is connected between a connecting point between the second switching element S2 and the battery 10 and the downstream power terminal 26.

Each of the first switching element S1 and the second switching element S2 may employ a semiconductor switching element such as a metal oxide semiconductor field effect transistor (MOSFET), a bipolar transistor, or an insulated gate bipolar transistor (IGBT). When an MOSFET is used as the first switching element S1, the drain terminal thereof is connected to the upstream power terminal 24 and the source terminal thereof is connected to the downstream power terminal 26. When an MOSFET is used as the second switching element S2, the source terminal thereof is connected to the upstream power terminal 24 and the drain terminal thereof is connected to the positive electrode terminal of the battery 10. Between the drain terminal and the source terminal of each MOSFET, a diode is connected to the drain terminal side toward a cathode terminal.

When a bipolar transistor or an IGBT is used instead of an MOSFET, the drain terminal and the source terminal of the MOSFET are replaced with the collector terminal and the emitter terminal of the bipolar transistor and the IGBT. Between the collector terminal and the emitter terminal, a diode is connected to the collector terminal side toward a cathode terminal.

One end of the control circuit 20 is connected to the upstream control terminal 28 and the other end of the control circuit 20 is connected to the downstream control terminal 30. A control signal Fi is output from the control circuit 20 to the first switching element S1, and a control signal Gi is output from the control circuit 20 to the second switching element S2. The first switching element S1 is turned on when the value of the control signal Fi is high, and the first switching element S1 is turned off when the value of the control signal Fi is low. Similarly, the second switching element S2 is turned on when the value of the control signal Gi is high, and the second switching element S2 is turned off when the value of the control signal Gi is low. The control signal Gi is a signal in which the high and low values of the control signal Fi are inverted.

When the first switching element S1 is in an ON state and the second switching element S2 is in an OFF state, the upstream power terminal 24 and the downstream power terminal 26 are short-circuited and the battery module Ui is turned off. When the first switching element S1 is in the OFF state and the second switching element S2 is in the ON state, the positive electrode of the battery 10 is connected to the upstream power terminal 24 and the battery 10 is connected between the upstream power terminal 24 and the downstream power terminal 26. Accordingly, the battery module Ui is turned on.

The battery modules U0 to U13 illustrated in FIG. 1 are connected in series by the power lines and the control lines as will be described below. The downstream power terminal 26 of the switch circuit 22 in a higher stage is connected to the upstream power terminal 24 of the switch circuit 22 in a lower stage adjacent thereto. The upstream power terminal 24 of the switch circuit 22 in the uppermost stage is connected to one end of the load 14 via the ammeter A and the SMR. The downstream power terminal 26 of the switch circuit 22 in the lowermost stage is connected to the other end of the load 14.

The downstream control terminal 30 of the control circuit 20 in a higher stage is connected to the upstream control terminal 28 of the control circuit 20 in a lower stage adjacent thereto. The upstream control terminal 28 of the control circuit 20 in the uppermost stage and the downstream control terminal 30 of the control circuit 20 in the lowermost stage are connected to the control unit 12.

(3) Hardware of Control Unit and Control Circuit

The control unit 12 and the control circuits 20 may include a processor that executes a program read from the outside or a program stored therein. In FIGS. 1 and 2, an example in which the control unit 12 and the control circuits 20 are configured as individual hardware components is illustrated, but the control unit 12 and all or one of the control circuits 20 may be integrally configured as a single hardware component.

In this way, the power supply system includes a plurality of battery modules U0 to U13 that is connected in series and the control unit 12 that controls the battery modules U0 to U13, and supplies electric power from the battery modules (U0 and U13) in the uppermost stage and the lowermost stage to the load 14. The control unit 12 performs ON/OFF control for setting the battery module Ui to the ON state in an active time, setting the battery module Ui to the OFF state in a non-active time, and alternately repeating the active time and the non-active time. The control unit 12 performs the ON/OFF control of the plurality of battery modules such that an ON/OFF control timing for the battery module in a lower stage adjacent to the battery module in a higher stage is delayed by a control delay time in comparison with the battery module in the higher stage. Accordingly, sweep switching for setting the battery module to the ON state for a predetermined active time is performed sequentially from the higher stage to the lower stage.

As will be described later, the control unit 12 may randomly determine the control delay time for the battery modules U1 to U13 in lower stages than the battery module U0 in the uppermost stage. The control unit 12 may randomly determine the active time for the battery modules U0 to U13. The control unit 12 may randomly determine a period which is a sum of the active time and the non-active time for each of the battery modules U0 to U13.

(4) Operation Modes of Power Supply System

The power supply system according to this embodiment operates in one of a basic mode and a noise suppression mode. The basic mode is an operation mode in which a control delay time with respect to an adjacent battery module is constant and a period of a control signal is constant. The noise suppression mode is an operation mode in which the control delay time with respect to an adjacent battery module varies or periods of control signals Gi and Fi vary.

(4-1) Basic Mode

Figure 3:
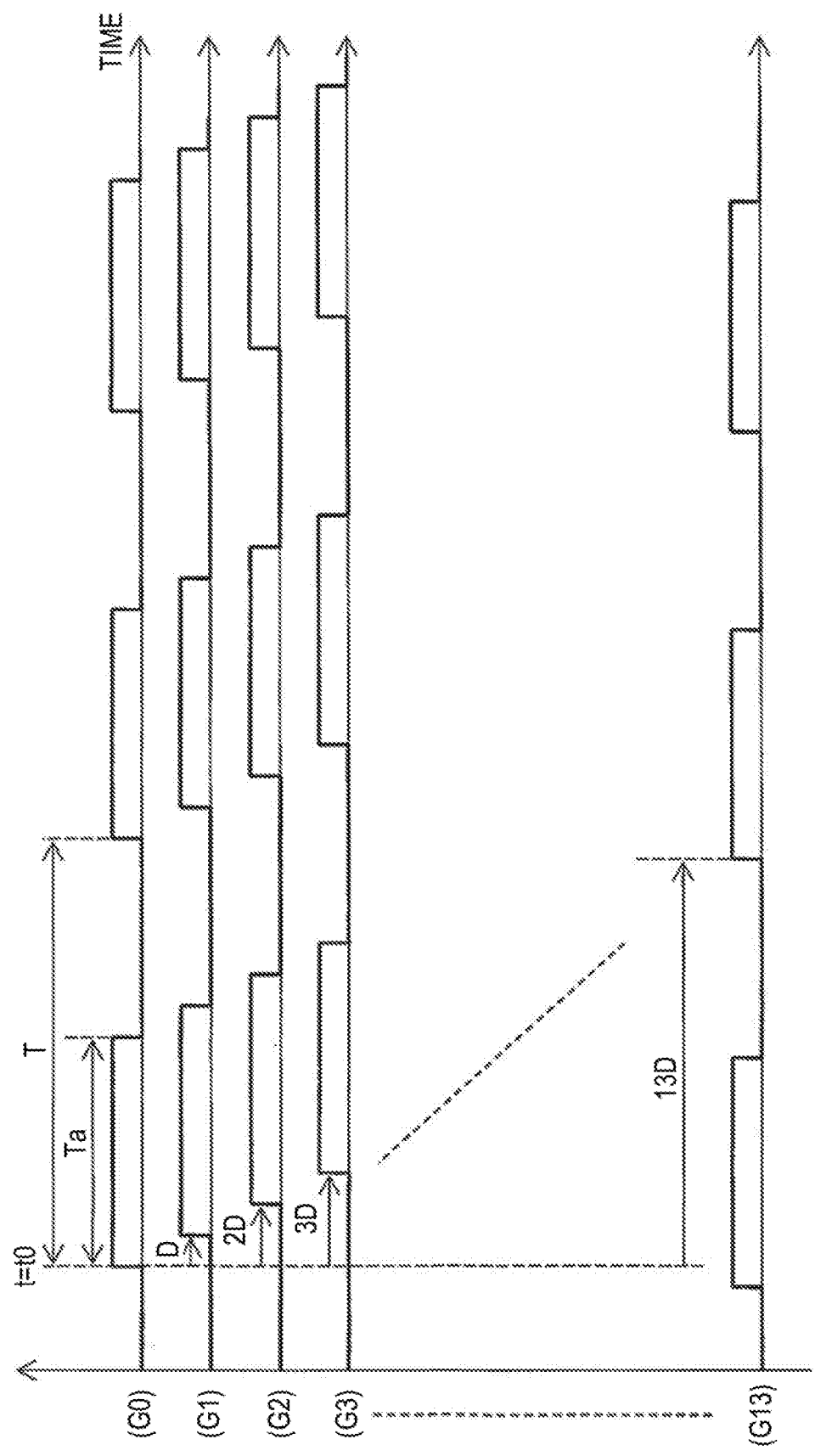
FIG. 3 is a diagram conceptually illustrating a timing chart of various control signals.

An operation in the basic mode will be described below. FIG. 3 conceptually illustrates a timing chart of control signals G0 to G13 which are output from the control circuit 20 to the second switching element S2 in the battery modules U0 to U13. In FIG. 3, (G0), (G1), (G2), (G3), . . . (G13) represent the control signals G0, G1, G2, G3, . . . G13 which are output from the control circuit 20 to the second switching element S2 in the battery modules U0, U1, U2, U3, . . . U13.

At time t=t0, the value of the control signal G0 rises from low to high. The value of the control signal G0 falls from high to low when an active time Ta elapses from time t=t0. An ON/OFF period of the control signal G0 is defined as T. That is, the value of the control signal G0 rises from low to high at a time at which the time T elapses from time to. The value of the control signal G0 repeatedly changes between high and low with the period T. The length of the active time in one period is Ta and the length of the non-active time in one period is T-Ta.

The control signals G1, G2, G3, . . . G13 are signals which are obtained by delaying the control signal G0 by control delay times D, 2D, 3D, . . . 13D, respectively. That is, the control signal Gj is a signal obtained by delaying the control signal G0 by the control delay time j·D. Here, j is an integer in a range from 1 to 13.

When the number of battery modules in the ON state is n, the control unit 12 sets the period T, the active time Ta, and the control delay time D as follows. That is, when i+n is equal to or less than 13, the control unit 12 sets the period T, the active time Ta, and the control delay time D for each control circuit 20 such that the control signal G(i+n) rises from low to high at a time at which the value of the control signal Gi falls from high to low. When i+n is greater than 13, the control unit 12 sets the period T, the active time Ta, and the control delay time D for each control circuit 20 such that the control signal G(i+n−14) rises from low to high at a time at which the value of the control signal Gi falls from high to low. Accordingly, n battery modules out of the battery modules U0 to U13 are switched to the ON state and 14-$n$ battery modules are switched to the OFF state. The period T, the number of battery modules n which are switched to the ON state, the control delay time D, and the active time Ta satisfy a relationship of T=(14−n)·D+Ta. When the output voltage of the battery 10 in each of the battery modules U0 to U13 is E, a voltage of n·E is applied to the load 14.

The control unit 12 acquires a measured voltage value from the voltmeter V and a measured current value from the ammeter A. The control unit 12 may calculate a measured power value from the measured voltage value and the measured current value. The control unit 12 may determine the number of battery modules n which are switched to the ON state, the control delay time D, the active time, and the period T such that the measured voltage value becomes a value in a target range or the measured current value becomes a value in a target range. Alternatively, the control unit 12 may determine the number of battery modules n which are switched to the ON state, the control delay time D, the active time Ta, and the period T such that the measured power value becomes a value in a target range.

The load capacitor CL curbs change of a voltage which is applied to the load 14. The change of a voltage which is applied to the load 14 is caused, for example, by switching of the switch circuit 22 in each battery module Ui. The intra-module capacitor Cm in the switch circuit 22 curbs change of a voltage which is generated between the upstream power terminal 24 and the downstream power terminal 26. The change of a voltage which is generated between the upstream power terminal 24 and the downstream power terminal 26 is caused, for example, by switching of a switching element in the switch circuit 22.

Figure 4:
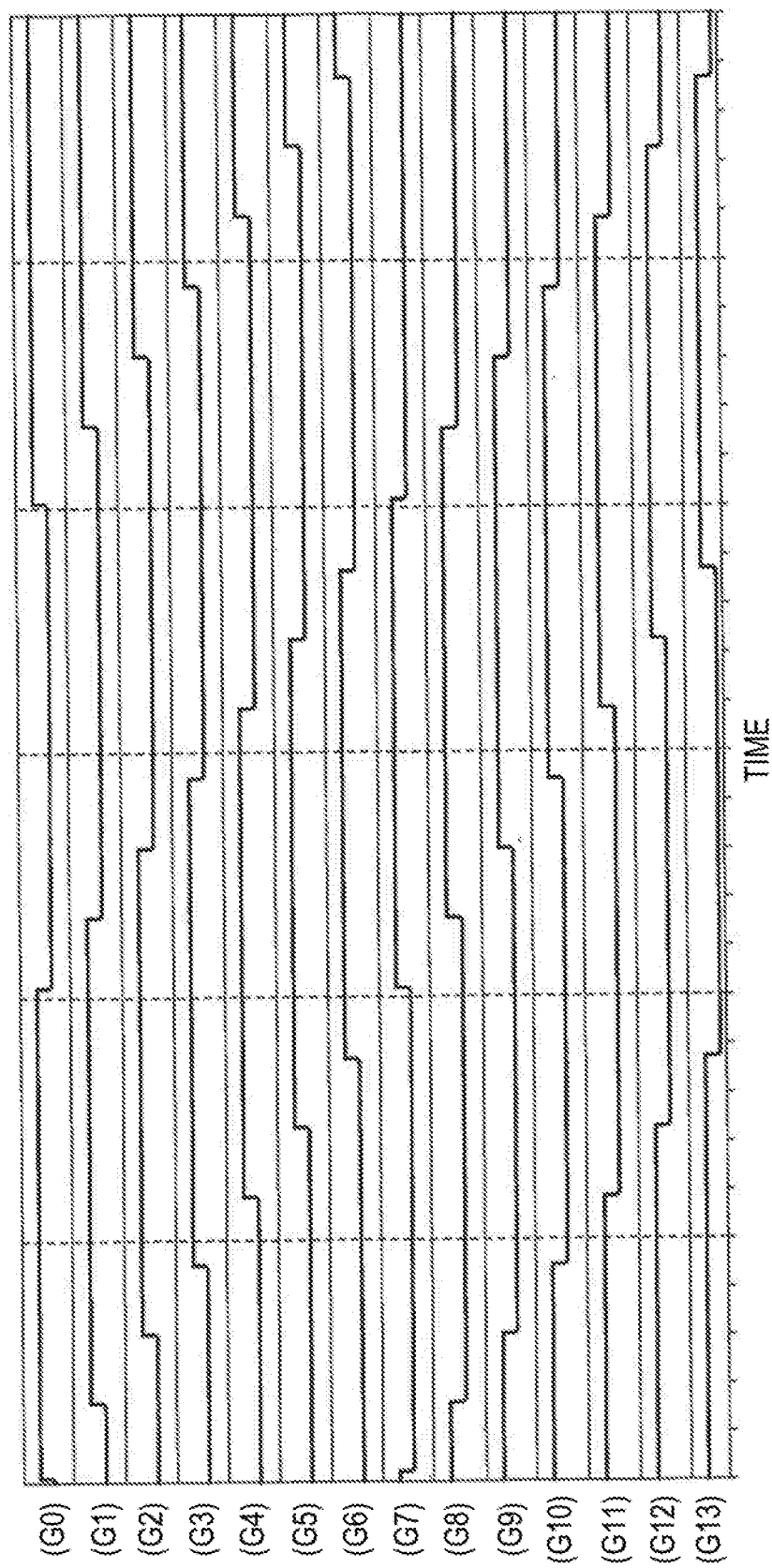
FIG. 4 is a diagram illustrating an example of a timing chart of various control signals.

FIG. 4 illustrates an example of a timing chart of the control signals G0 to G13. In this example, the number of battery modules n in the ON state is n=7, seven battery modules out of the battery modules U0 to U13 are in the ON state and the remaining seven battery modules are in the OFF state. The period T, the active time Ta, and the control delay time D are determined such that the control signal G0 rises from low to high at the time at which the value of the control signal G7 falls from high to low. When the output voltage of the battery 10 in each of the battery modules U0 to U13 is E, a voltage of 7 E is applied to the load 14.

The operation in the basic mode of each battery module Ui illustrated in FIG. 2 will be described below. The control circuit 20 in each battery module Ui operates as follows under the control of the control unit 12. The control circuit 20 switches the second switching element S2 from OFF to ON and switches the first switching element S1 from ON to OFF when an upstream control voltage which is input to the upstream control terminal 28 rises from low to high and the control delay time i·D has elapsed after the upstream control voltage has risen from low to high. The control circuit 20 switches the second switching element S2 from ON to OFF and switches the first switching element S1 from OFF to ON when the active time Ta has elapsed after the second switching element S2 has been switched from OFF to ON and the first switching element S1 has been switched from ON to OFF.

The control circuit 20 raises a downstream control voltage which is output from the downstream control terminal 30 from low to high when the upstream control voltage has risen from low to high and the control delay time i·D has elapsed after the upstream control voltage has risen. Then, the control circuit 20 decreases the downstream control voltage from high to low when the active time Ta has elapsed after the downstream control voltage has risen.

The control unit 12 inputs the control signal G0 illustrated in FIG. 3 to the upstream control terminal 28 of the battery module U0. The battery module U0 is switched to the ON state or the OFF state according to the control signal G0. Each battery module Ui is switched to the ON state when the control delay time i·D has elapsed after the value of the control signal G0 has risen, and is switched to the OFF state after the ON state has been kept in the active time Ta.

As described above, the switch circuit 22 in each of the battery modules U0 to U13 includes the switching elements S1 and S2, and the switching elements S1 and S2 are alternately repeatedly switched between the ON state and the OFF state. Accordingly, a noise voltage or a noise current (hereinafter simply referred to as noise) of a specific frequency may be generated in the power lines and the control lines and thus the control unit 12 and the control circuits 20 may not operate appropriately. Therefore, the power supply system may operate in the noise suppression mode which will be described below.

(4-2) Noise Suppression Mode

The noise suppression mode includes a delay time change mode and a period change mode. The delay time change mode is an operation mode in which the control delay time for each of the battery modules U0 to U13 is set to a value which varies randomly. The period change mode is an operation mode in which the switching period between the ON state and the OFF state for each of the battery modules U0 to U13 is set to a value which varies randomly. In the period change mode, the control delay times for the battery modules U0 to U13 may be constant.

(4-2-1) Delay Time Change Mode

Figure 5:
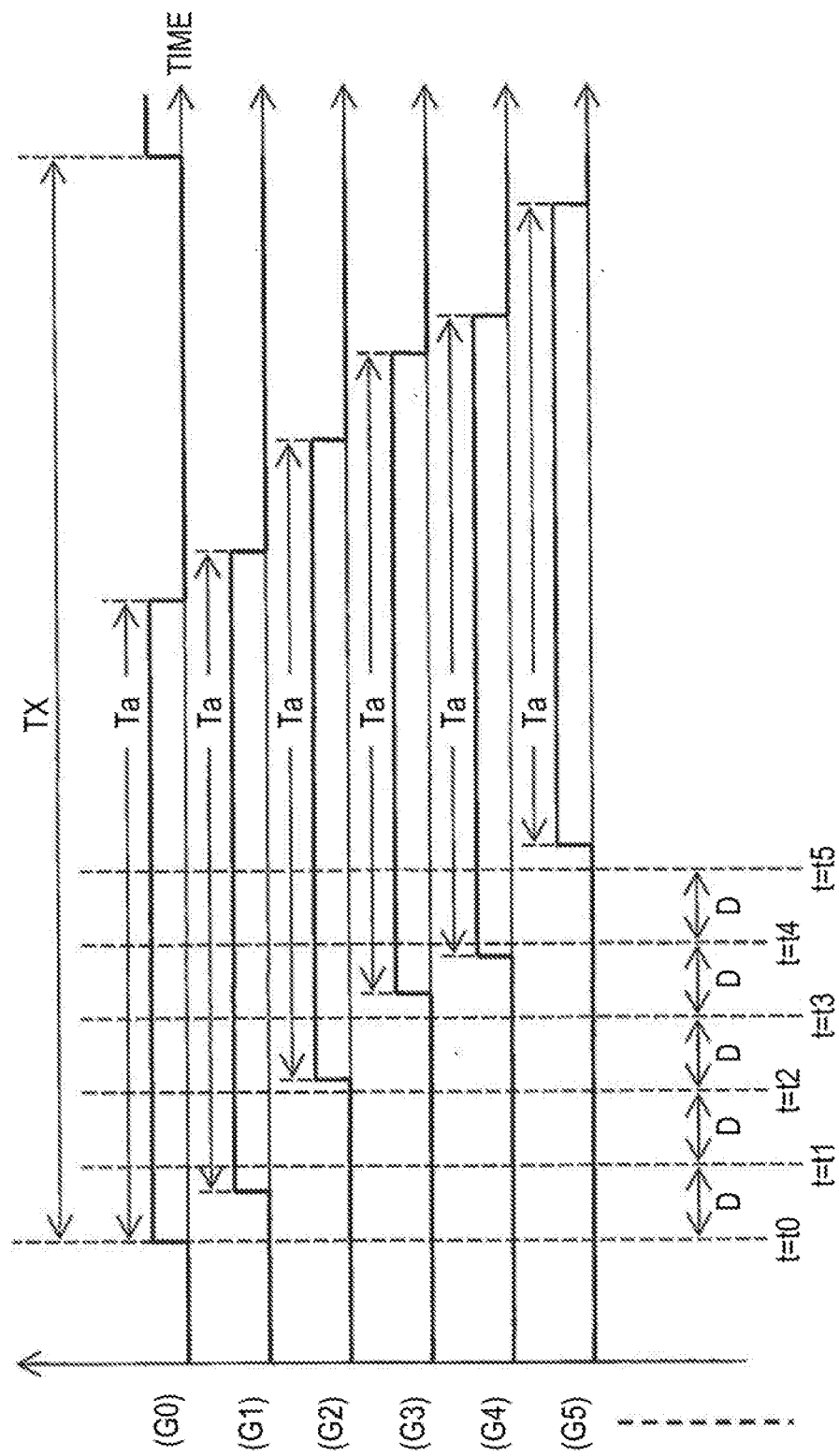
FIG. 5 is a diagram conceptually illustrating a timing chart of various control signals in a delay time change mode.

FIG. 5 conceptually illustrates a timing chart of the control signals G0 to G5 in the delay time change mode. Times t=t0 to t5 are times at which the values of the control signals G0 to G5 rise from low to high, respectively, in the basic mode. As illustrated in FIG. 5, the values of the control signals G1 to G5 rise at times which deviate randomly before and after times t=t1 to t5. That is, the times at which the values of the control signals G1 to G5 rise vary randomly from the rising times in the basic mode. The times which deviate randomly before and after times t=t1 to t5 also include times t=t1 to t5 (a case in which the deviations of the rising time are 0). The values of the control signals G0 to G5 fall when the active time Ta has elapsed after the values have risen from low to high.

The control signals G0 to G5 are illustrated in FIG. 5, and the control signals G6 to G13 change in the same way as the control signals G0 to G5 change. That is, the values of the control signals G6 to G13 rise at times which deviate randomly from the time at which the values rise in the basic mode. The values of the control signals G6 to G13 fall when the active time Ta has elapsed after the values have risen from low to high.

The period Tx of the control signal G0 is a time Tx which is obtained by adding control delay times $\alpha 1$ to $\alpha n$ for the battery modules U1 to Un to the period T in the basic mode. That is, the period of the control signal G0 is determined by a relationship of Tx=T+$\alpha 1$+$\alpha 2$+$\alpha 3$+ . . . +$\alpha n$=(14−n)·D+

Ta+Σαj. Here, Σ refers to summing with respect to j=1 to n. Here, n represents the number of battery modules in the ON state. In this way, the value of the control signal G0 rises from low to high, falls when the active time Ta elapses, and rises again when Tx=(14−n)·D+Ta+Σαj elapses from the previous rising time.

The specific operation of the power supply system in the delay time change mode will be described below with reference to FIGS. 1 and 2. The control unit 12 determines reference delay times d1 to d13 for the battery modules U1 to U13. The reference delay times d1 to d13 are acquired through the same process as the process of acquiring the control delay time in the basic mode. That is, with the reference delay time d1 of the battery module U1 as D, a relationship of dj=j·D is satisfied.

The control unit 12 determines delay adjustment times δ1 to δ13 for the battery modules U1 to U13 to be positive or negative values which vary randomly. The control unit 12 calculates values obtained by adding the delay adjustment times δ1 to δ13 to the reference delay times d1 to d13 as the control delay times α1 to α13 for the battery modules U1 to U13. That is, the control unit 12 calculates the control delay time αj based on a relationship of αj=dj+δj. The control unit 12 outputs the control delay times α1 to α13 to the control circuits 20 of the battery modules U1 to U13. The delay adjustment time δj may be determined in a range of ±5% with respect to the reference delay time dj. That is, the delay adjustment time δj and the reference delay time dj may satisfy a relationship of −0.05dj≤δj≤0.05dj.

The control unit 12 may determine delay adjustment coefficients Δ1 to Δ13 which are multiplied by the reference delay times d1 to d13 as positive values which vary randomly instead of the delay adjustment times δ1 to δ13 which are added to the reference delay times d1 to d13. In this case, the control unit 12 calculates values obtained by multiplying the reference delay times d1 to d13 by the delay adjustment coefficients Δ1 to Δ13 as the delay adjustment times α1 to α13 for the battery modules U1 to U13. That is, the control unit 12 calculates the control delay time αj based on a relationship of αj=Δj·dj. The delay adjustment coefficient Δj may be a coefficient for changing the reference delay time dj within a range of ±5%. That is, Δj is a value in a range of from 0.95 to 1.05.

The operation in the delay time change mode of the control circuit 20 in the battery module U0 is the same as the operation in the basic mode thereof. The control circuit 20 in each of the battery modules U1 to U13 operates as follows under the control of the control unit 12. When an upstream control voltage which is input to the upstream control terminal 28 rises from low to high and the control delay time αj has elapsed after the upstream control voltage has risen from low to high, the control circuit 20 switches the second switching element S2 from OFF to ON and switches the first switching element S1 from ON to OFF. The control circuit 20 switches the second switching element S2 from ON to OFF and switches the first switching element S1 from OFF to ON when the active time Ta has elapsed after the second switching element S2 has been switched from OFF to ON and the first switching element S1 has been switched from ON to OFF.

The control circuit 20 raises a downstream control voltage which is output from the downstream control terminal 30 from low to high when the upstream control voltage has risen from low to high and the control delay time αj has elapsed after the upstream control voltage has risen from low to high. Then, the control circuit 20 falls the downstream control voltage from high to low when the active time Ta has elapsed after the downstream control voltage has risen from low to high.

The control unit 12 inputs the control signal G0 illustrated in FIG. 5 to the upstream control terminal 28 of the battery module U0. The battery module U0 is switched to the ON state or the OFF state according to the control signal G0. Each battery module Uj is switched to the ON state when the control delay time αj has elapsed after the value of the control signal G(j−1) has risen, and is kept in the ON state for the active time Ta.

The control unit 12 raises the value of the control signal G0 for the battery module U0 from low to high according to the timing at which the voltage of the downstream control terminal 30 of the control circuit 20 in the battery module Un has fallen. The period of the control signal G0 is Tx=(14−n)·D+Ta+Σαj and the time from the previous rising of the control signal G0 to the next rising thereof is appropriately set based on the variation of the control delay time αj for the battery module Uj.

The control unit 12 may recognize the timing at which the value of the control signal G0 for the battery module U0 rises from low to high based on the timing at which the voltage of the downstream control terminal 30 of the control circuit 20 in one of the battery modules U1 to U13 in stages lower than the battery module U0 in the uppermost stage rises or falls, and may raise the value of the control signal G0 from low to high.

In the operation in the delay time change mode, since the control delay times α1 to α13 are times which vary randomly, the frequency of noise which is generated in the power lines and the control lines varies. Accordingly, an influence in noise of a specific frequency on the control unit 12 or the control circuits 20 is curbed.

(4-2-2) Period Change Mode

Figure 6:
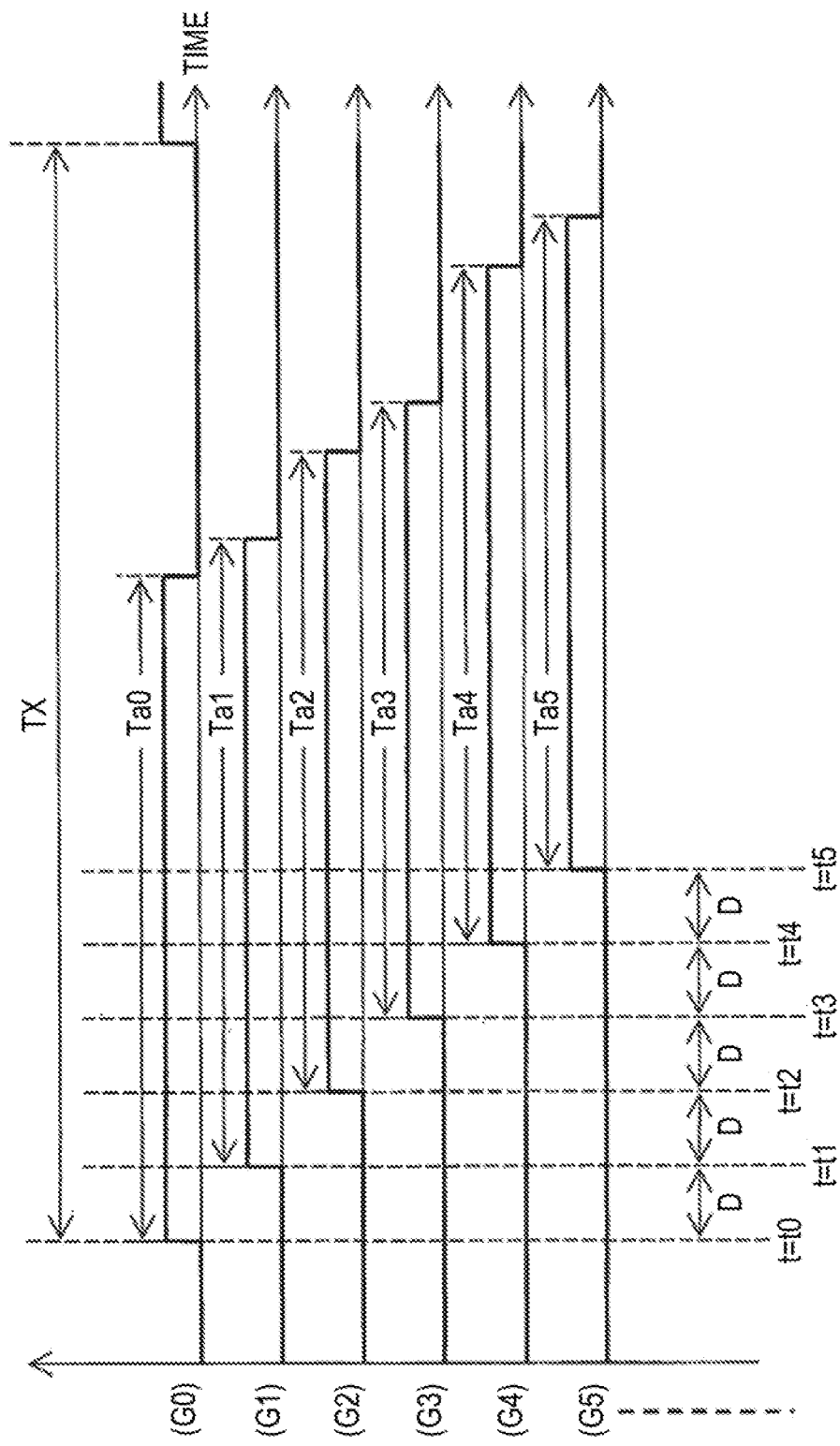
FIG. 6 is a diagram conceptually illustrating a timing chart of various control signals in a period change mode.

The period change mode of the noise suppression mode will be described below. FIG. 6 conceptually illustrates a timing chart of the control signals G0 to G5 in the period change mode.

As illustrated in FIG. 6, the active times Ta0 to Ta5 of the control signals G1 to G5 vary randomly with respect to the active time Ta in the basic mode and the period of the control signal G1 to G5 vary randomly. The control signals G0 to G5 are illustrated in FIG. 6 and the control signals G6 to G13 change in the same way as the control signals G0 to G5 change. That is, the active times of the control signals G6 to G13 vary randomly with respect to the active time Ta in the basic mode and the periods of the control signals G1 to G5 vary randomly.

The operation of the power supply system in the period change mode will be described below with reference to FIGS. 1 and 2. The control unit 12 determines the same control delay time di=i·D as the control delay time in the basic mode for each battery module Ui. The active time Ta in the basic mode is determined as a reference active time TTa in the period change mode.

The control unit 12 determines active adjustment times γ0 to γ13 to be positive or negative values which vary randomly for the battery modules U0 to U13. The control unit 12 calculates values obtained by adding the active adjustment times γ0 to γ13 to the reference active time TTa as the active delay times Ta0 to Ta13 for the battery modules U0 to U13. That is, the control unit 12 calculates the active time Tai based on a relationship of Tai=TTa+γi. The control unit 12 outputs the control delay times d1 to d13 to the control circuits 20 of the battery modules U1 to U13. The control unit 12 outputs the active times Ta0 to Ta13 to the control circuits 20 of the battery modules U0 to U13. The active adjustment time γi may be determined in a range of ±2% with respect to the period T in the basic mode. That is, the active adjustment time γi and the period T in the basic mode may satisfy a relationship of −0.02T≤γi≤0.02T.

The control unit 12 may determine active adjustment coefficients Γ0 to Γ13 which are multiplied by the reference active time TTa as positive values which vary randomly instead of the active adjustment times γ0 to γ13 which are added to the reference active time TTa. In this case, the control unit 12 calculates values obtained by multiplying the reference active time TTa by the active adjustment coefficients Γ0 to Γ13 as the active times Ta0 to Ta13 for the battery modules U1 to U13. That is, the control unit 12 calculates the active time Tai based on a relationship of Tai=Γi·TTa. The active adjustment coefficient Γi may be a coefficient for changing the active time within a range of ±2%. That is, Γi is a value in a range of from 0.98 t0 1.02.

The control circuit 20 in each of the battery modules U0 to U13 operates as follows under the control of the control unit 12. When an upstream control voltage which is input to the upstream control terminal 28 rises from low to high and the control delay time di has elapsed after the upstream control voltage has risen from low to high, the control circuit 20 switches the second switching element S2 from OFF to ON and switches the first switching element S1 from ON to OFF. The control circuit 20 switches the second switching element S2 from ON to OFF and switches the first switching element S1 from OFF to ON when the active time Tai has elapsed after the second switching element S2 has been switched from OFF to ON and the first switching element S1 has been switched from ON to OFF.

The control circuit 20 raises a downstream control voltage which is output from the downstream control terminal 30 from low to high when the upstream control voltage has risen from low to high and the control delay time di has elapsed after the upstream control voltage has risen from low to high. Then, the control circuit 20 falls the downstream control voltage from high to low when the active time Tai has elapsed after the downstream control voltage has risen from low to high.

The control unit 12 inputs the control signal G0 illustrated in FIG. 6 to the upstream control terminal 28 of the battery module U0. The battery module U0 is switched to the ON state or the OFF state according to the control signal G0. The battery modules U1 to U13 are switched to the ON state when the control delay times d1 to d13 have elapsed after the value of the control signal G0 has risen, and is kept in the ON state for the active times Ta1 to Ta13.

The control unit 12 raises the value of the control signal G0 for the battery module U0 from low to high based on the timing at which the voltage of the downstream control terminal 30 of the control circuit 20 in the battery module Un has fallen. The period of the control signal G0 is Tx=(14−n)·D+Ta+γn. Here, n denotes the number of battery modules in the ON state. In this way, the time from the previous rising of the control signal G0 to the next rising thereof is appropriately set based on the variation of the active time for each battery module.

The control unit 12 may recognize the timing at which the value of the control signal G0 for the battery module U0 rises from low to high based on the timing at which the voltage of the downstream control terminal 30 of the control circuit 20 in one of the battery modules U1 to U13 in stages lower than the battery module U0 in the uppermost stage rises or falls, and may raise the value of the control signal G0 from low to high.

In the operation in the period change mode, since the active adjustment times γ0 to γ13 vary randomly and the period of ON/OFF control for each battery module is a time which varies randomly. Accordingly, the frequency of noise which is generated in the power lines and the control lines varies. Accordingly, an influence in noise of a specific frequency on the control unit 12 or the control circuits 20 is curbed.

(4-2-3) Delay Time and Period Change Mode

Figure 7:
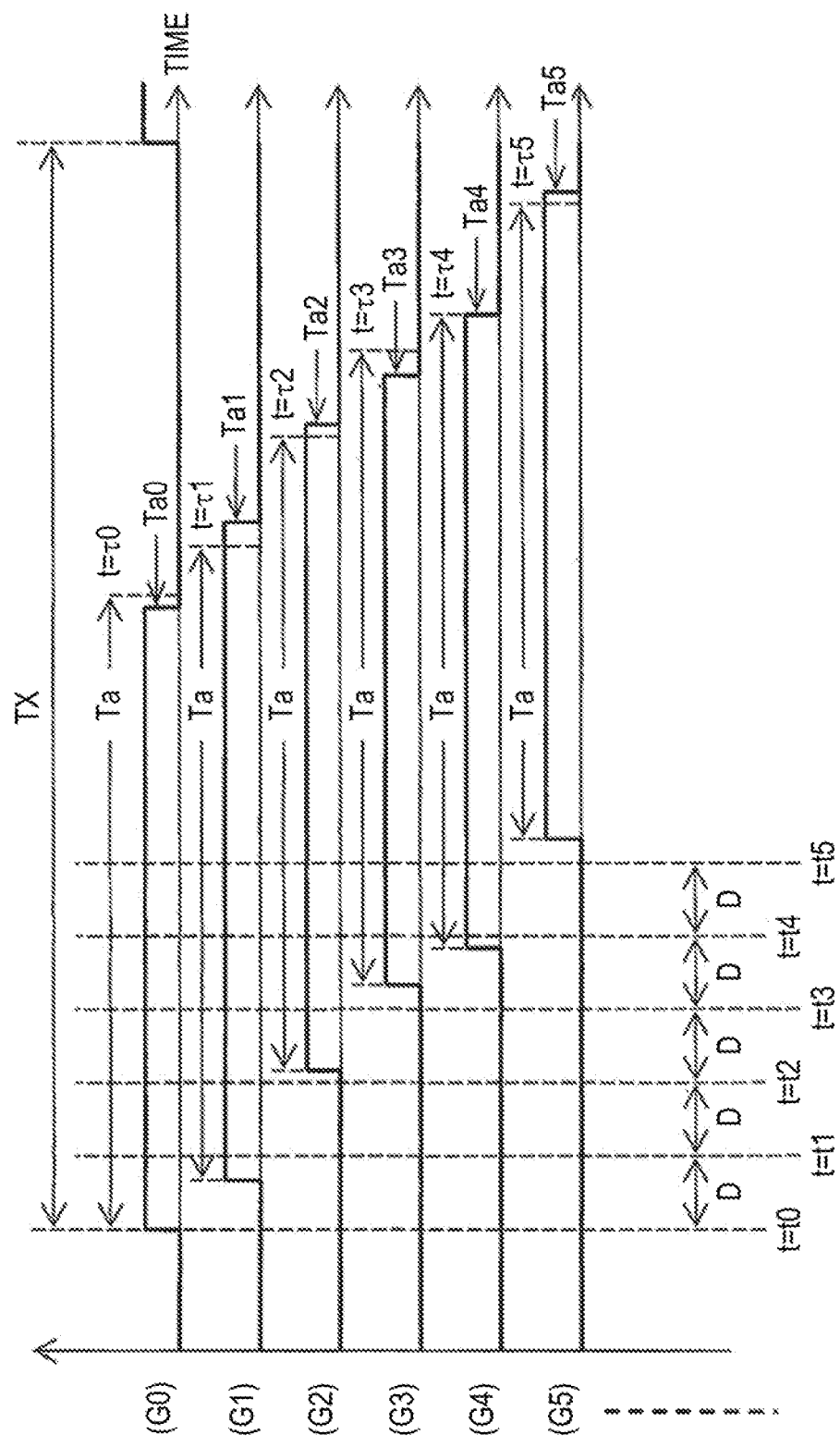
FIG. 7 is a diagram conceptually illustrating a timing chart of various control signals in a delay time and period change mode.

The delay time and period change mode will be described below. The delay time and period change mode is an operation mode in which the delay time change mode and the period change mode are combined. FIG. 7 conceptually illustrates a timing chart of the control signals G0 to G5 in the delay time and period change mode.

Times t=t0 to t5 are times at which the values of the control signals G0 to G5 rise from low to high, respectively, in the basic mode. Times t=t0 to t5 are times at which the values of the control signals G0 to G5 fall from high to low when the active times are set to a constant value Ta.

As illustrated in FIG. 7, the values of the control signals G1 to G5 rise at times which deviate randomly before and after times t=t1 to t5. That is, the times at which the values of the control signals G1 to G5 rise vary randomly from the times at which the control signals rise in the basic mode. The active times Ta0 to Ta5 of the control signals G1 to G5 vary randomly from the active time Ta in the basic mode.

The control signals G0 to G5 are illustrated in FIG. 7 and the control signals G6 to G13 change in the same way as the control signals G0 to G5 change. That is, the values of the control signals G6 to G13 rise at times which deviate randomly from the time at which the control signal rises in the basic mode, and the active times of the control signals G6 to G13 vary randomly with respect to the active time in the basic mode.

In the operation in the delay time and period change mode, the control delay times and the period of the control signals G0 to G13 are times which vary randomly. Accordingly, the frequency of noise which is generated in the power lines and the control lines varies. Accordingly, an influence in noise of a specific frequency on the control unit 12 or the control circuits 20 is curbed.

(5) Mode Changing Process

When the power supply system supplies electric power to the load 14 through the operation in the basic mode, the control unit 12 may acquire a measured voltage value from the voltmeter V and a measured current value from the ammeter A and perform the following process. When the measured voltage value is not in a target range, when the measured current value is not in a target range, or when a measured power value is not in a target range, the control unit 12 changes a voltage which is applied to the load 14 by changing at least one of the period, the active time, and the control delay time in the basic mode (hereinafter, at least one of the period, the active time, and the control delay time is referred to as a parameter time). That is, the control unit 12 changes the number of battery modules which are switched to the ON state out of the battery modules U0 to U13 when the measured voltage value is not in the target range, when the measured current value is not in the target range, or when the measured power value is not in the target range.

In this way, in a power control process of controlling a power supply state with respect to the load 14 by changing the control parameter time in the basic mode, specific frequency components included in two or more of the control signals G0 to G13 may reinforce each other in the process of changing the control parameter time. Accordingly, noise which is generated in the control lines and the power lines may increase and the control unit 12 or the control circuits 20 may not operate appropriately. Therefore, the power supply system may operate in the basic mode at the normal time at which the power control process is not performed, and operate in any one of the delay time change mode, the period change mode, and the delay time and period change mode at the power control time at which the power control process is performed.

For example, in the power control process, the control unit 12 changes the control parameter time by a predetermined pitch at intervals of a predetermined time such that the measured voltage value, the measured current value, or the measured power value enters in the target range. The control unit 12 operates in any one mode of the delay time change mode, the period change mode, and the delay time and period change mode while changing the control parameter time by a predetermined pitch. The control unit 12 operates in the basic mode when the control parameter time is set to be constant.

In the mode changing process, noise of specific frequencies which is generated in the control lines and the power lines in the process of changing the control parameter time is curbed. In the operation in the delay time change mode, the period change mode, or the delay time and period change mode, ripple components of a current flowing in the power lines may increase in comparison with those in the basic mode. Therefore, large ripple components in the current flowing in the power lines are prevented from flowing for a long time by operating in the basic mode at the normal time and operating in any mode of the delay time change mode, the period change mode, and the delay time and period change mode at the power control processing time.

(6) Direct Control of Each Battery Module

Figure 8:
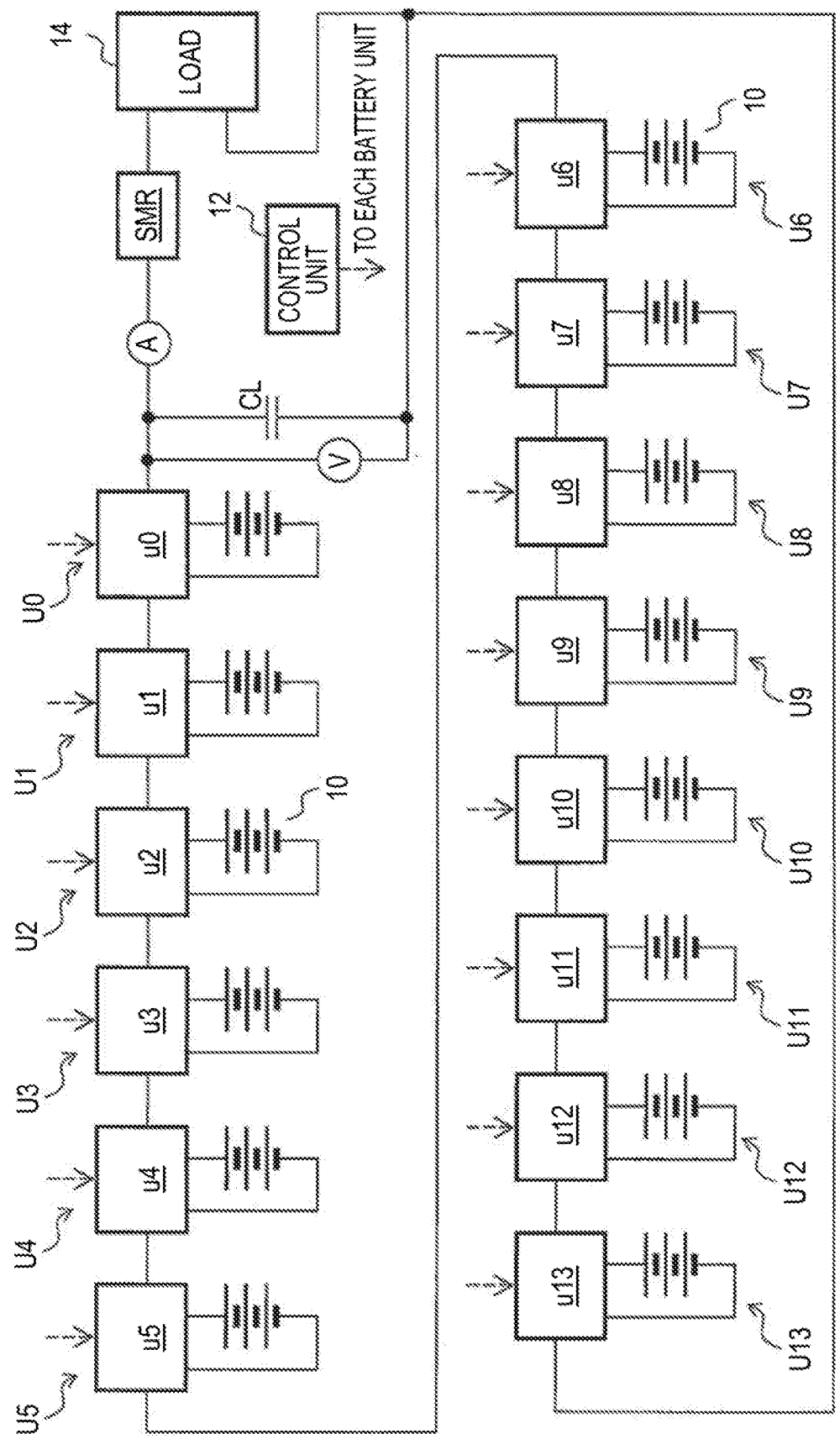
FIG. 8 is a diagram illustrating a configuration of a power supply system.

In the above embodiment, the control circuits 20 in the battery modules U0 to U13 are connected in series has been described above. In this embodiment, the control circuit 20 in a higher stage outputs a downstream control voltage to the control circuit 20 in a lower stage, and the control circuit 20 in the lower stage controls the switch circuit 22 according to the downstream control voltage output from the control circuit 20 in the higher stage. Instead of connecting the control circuits 20 in series in this way, the control unit 12 may directly control the control circuits 20 in the battery modules U0 to U13. FIG. 8 illustrates a configuration of a power supply system that performs such control. The control unit 12 directly outputs control information such as the period, the control delay time, and the active time and a timing signal indicating a control timing to the control circuits 20 of the battery modules U0 to U13. Each control circuit 20 controls the switch circuit 22 according to the control information and the timing signal indicating the control timing which are output from the control unit 12.

(7) Simulation Result

Figure 9:
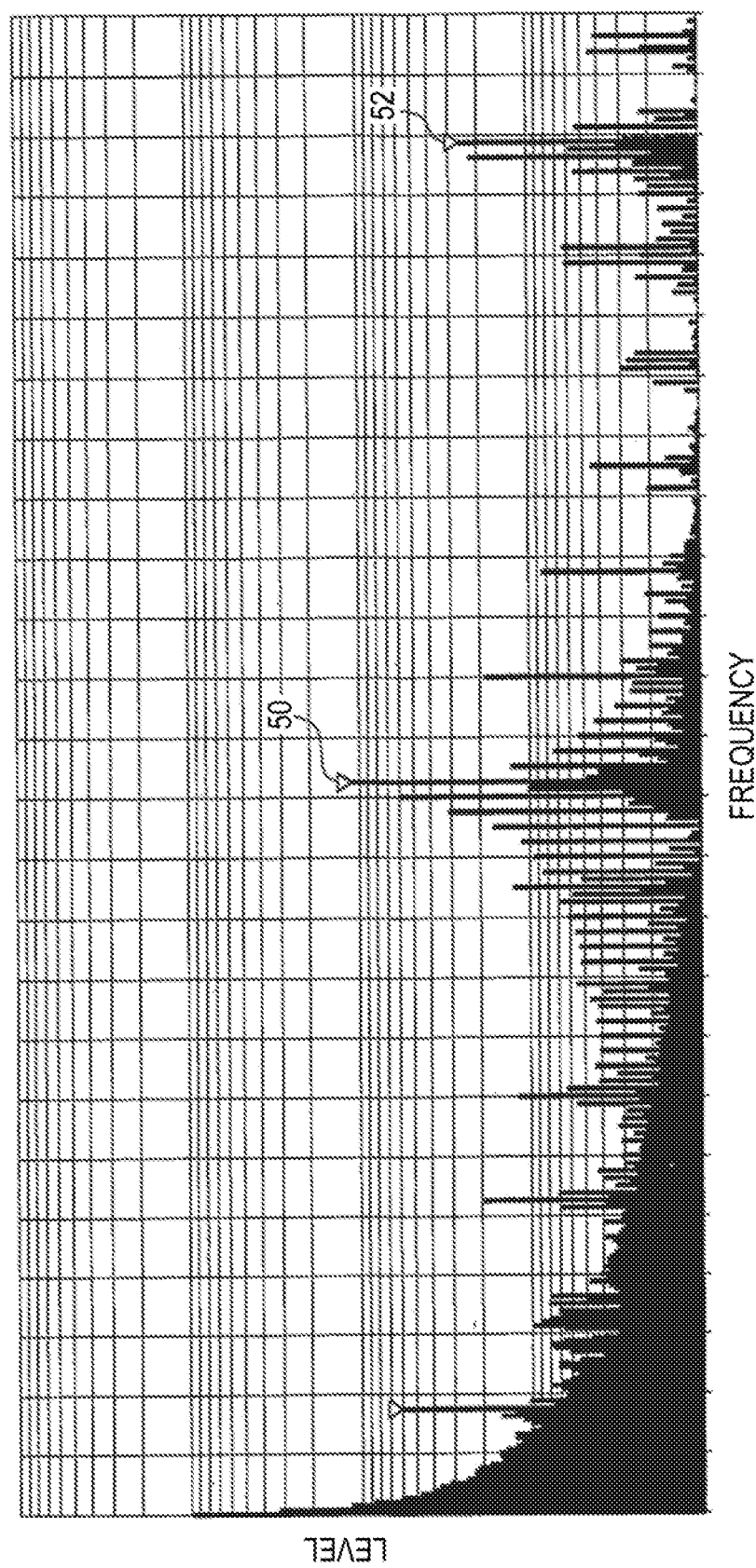
FIG. 9 is a diagram illustrating a simulation result when the power supply system operates in a basic mode.

FIG. 9 illustrates a simulation result of a frequency spectrum of a current flowing in the power lines when the power supply system operates in the basic mode. The horizontal axis represents the frequency and the vertical axis represents a level of a frequency component. The same is true of the horizontal axis and the vertical axis in the below simulation results. The levels of a seventh harmonic component 50 and a thirteenth harmonic component 52 out of harmonic components are higher than those of other harmonic components.

Figure 10:
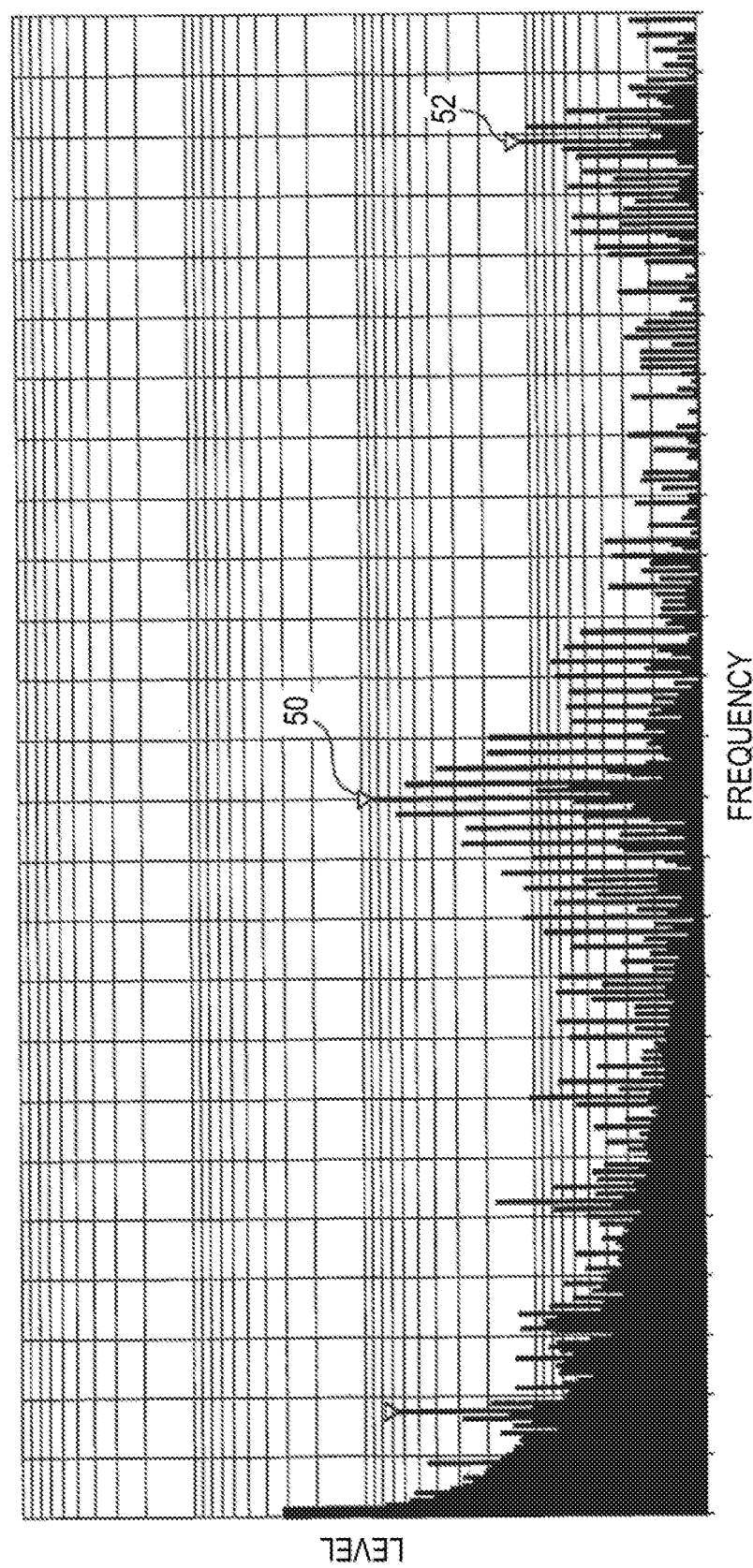
FIG. 10 is a diagram illustrating a simulation result when the power supply system operates in the delay time change mode.

FIG. 10 illustrates a simulation result of a frequency spectrum of a current flowing in the power lines when the power supply system operates in the delay time change mode. The delay adjustment time $\delta j$ changes within a range of ±5% with respect to the reference delay time dj. In this simulation result, the level of the seventh harmonic component 50 decreases by 21% with respect to the basic mode.

Figure 11:
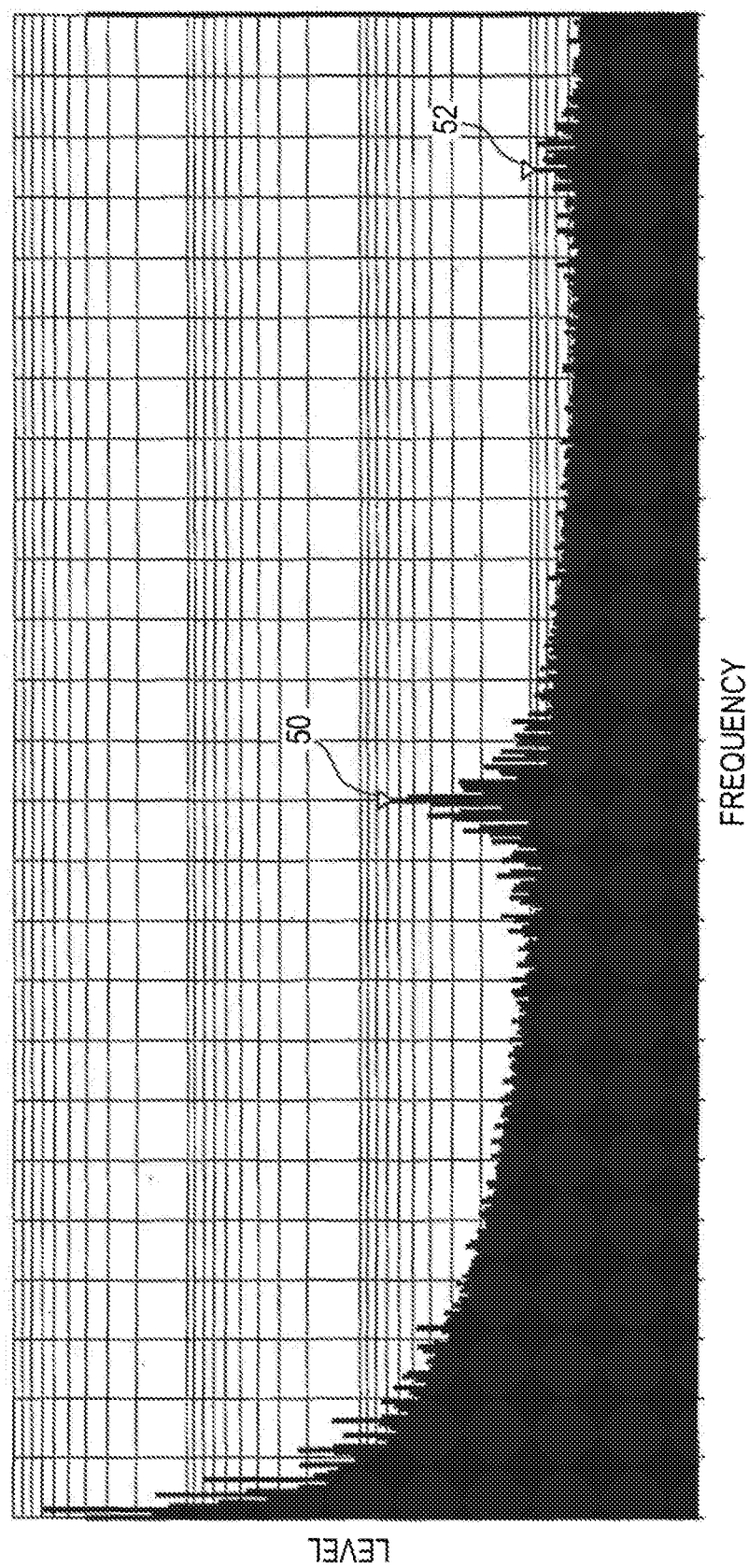
FIG. 11 is a diagram illustrating a simulation result when the power supply system operates in the period change mode.

FIG. 11 illustrates a simulation result of a frequency spectrum of a current flowing in the power lines when the power supply system operates in the period change mode. The period changes within a range of ±2% with respect to the period T in the basic mode. In this simulation result, the level of the seventh harmonic component 50 decreases by 42% with respect to the basic mode.

FIG. 12 illustrates a simulation result of a frequency spectrum of a current flowing in the power lines when the power supply system operates in the delay time and period change mode. The delay adjustment time $\delta j$ changes within a range of ±5% with respect to the reference delay time dj. The period changes within a range of ±2% with respect to the period T in the basic mode. In this simulation result, the level of the seventh harmonic component 50 decreases by 45% with respect to the basic mode.

The power supply systems according to the above embodiments may be mounted in a motor-driven vehicle such as an electric vehicle and a hybrid vehicle. In general, a DC power supply system that transmits and receives electric power to and from a motor generator for driving and regeneration is mounted in a motor-driven vehicle. The power supply systems according to the embodiments of the disclosure may be used as the DC power supply system which is mounted in a motor-driven vehicle.

What is claimed is:

1. A power supply system comprising:
a plurality of battery modules that is connected in series; and
a control unit configured to control the battery modules,
wherein electric power is supplied from the battery modules in an uppermost stage and a lowermost stage to a load, and
wherein the control unit is configured to:
perform ON/OFF control for setting the battery modules to an ON state in an active time, setting the battery modules to an OFF state in a non-active time, and alternately repeating the active time and the non-active time;
perform the ON/OFF control of the plurality of battery modules such that an ON/OFF control timing for the battery module in a lower stage adjacent to the battery module in a higher stage is delayed by a control delay time in comparison with the battery module in the higher stage; and
randomly determine the control delay time for the battery modules in lower stages than the battery module in the uppermost stage.

2. The power supply system according to claim 1, wherein the control unit is configured to randomly determine the control delay time for each battery module when an electric power supply state with respect to the load is controlled by changing at least one of a period which is a sum of the active time and the non-active time, the active time, and the control delay time.

3. The power supply system according to claim 1, wherein the control unit is configured to perform the ON/OFF control on the battery module in the uppermost stage according to an ON/OFF control timing for the battery module in any one stage lower than the uppermost stage.

4. A power supply system comprising:
a plurality of battery modules that is connected in series; and a control unit configured to control the battery modules,
wherein electric power is supplied from the battery modules in an uppermost stage and a lowermost stage to a load, and
wherein the control unit is configured to:
perform ON/OFF control for setting the battery modules to an ON state in an active time, setting the battery modules to an OFF state in a non-active time, and alternately repeating the active time and the non-active time;
perform the ON/OFF control of the plurality of battery modules such that an ON/OFF control timing for the battery module in a lower stage adjacent to the battery module in a higher stage is delayed by a control delay time in comparison with the battery module in the higher stage; and
randomly determine the active time for each battery module.

5. The power supply system according to claim 4, wherein the control unit is configured to randomly determine a period which is a sum of the active time and the non-active time for each battery module.

6. The power supply system according to claim 4, wherein the control unit is configured to randomly determine the control delay time for the battery modules in lower stages than the battery module in the uppermost stage.

7. The power supply system according to claim 6, wherein the control unit is configured to randomly determine the control delay time for each battery module when an electric power supply state with respect to the load is controlled by changing at least one of a period which is a sum of the active time and the non-active time, the active time, and the control delay time.

8. The power supply system according to claim 4, wherein the control unit is configured to randomly determine the active time for each battery module when an electric power supply state with respect to the load is controlled by changing at least one of a period which is a sum of the active time and the non-active time, the active time, and the control delay time.

9. The power supply system according to claim 5, wherein the control unit is configured to randomly determine the period which is a sum of the active time and the non-active time for each battery module when an electric power supply state with respect to the load is controlled by changing at least one of the period, the active time, and the control delay time.

10. The power supply system according to claim 4, wherein the control unit is configured to perform the ON/OFF control on the battery module in the uppermost stage according to an ON/OFF control timing for the battery module in any one stage lower than the uppermost stage.

11. A power supply system comprising:
a plurality of battery modules that is connected in series; and
a control unit configured to control the battery modules,
wherein electric power is supplied from the battery modules in an uppermost stage and a lowermost stage to a load, and
wherein the control unit is configured to:
perform ON/OFF control for setting the battery modules to an ON state in an active time, setting the battery modules to an OFF state in a non-active time, and alternately repeating the active time and the non-active time;
perform the ON/OFF control of the plurality of battery modules such that an ON/OFF control timing for the battery module in a lower stage adjacent to the battery module in a higher stage is delayed by a control delay time in comparison with the battery module in the higher stage; and
randomly determine a period which is a sum of the active time and the non-active time for each battery module.

12. The power supply system according to claim 11, wherein the control unit is configured to randomly determine the control delay time for the battery modules in lower stages than the battery module in the uppermost stage.

13. The power supply system according to claim 12, wherein the control unit is configured to randomly determine the control delay time for each battery module when an electric power supply state with respect to the load is controlled by changing at least one of a period which is a sum of the active time and the non-active time, the active time, and the control delay time.

14. The power supply system according to claim 11, wherein the control unit is configured to randomly determine the period which is a sum of the active time and the non-active time for each battery module when an electric power supply state with respect to the load is controlled by changing at least one of the period, the active time, and the control delay time.

15. The power supply system according to claim 11, wherein the control unit is configured to perform the ON/OFF control on the battery module in the uppermost stage according to an ON/OFF control timing for the battery module in any one stage lower than the uppermost stage.

* * * * *